United States Patent
Capelli et al.

(10) Patent No.: US 6,344,863 B1
(45) Date of Patent: Feb. 5, 2002

(54) THREE-DIMENSIONAL GUI WINDOWS WITH VARIABLE-SPEED PERSPECTIVE MOVEMENT

(75) Inventors: Ronald B. Capelli, Round Rock; Joseph Kubik; Michael Joseph Sullivan, both of Austin; Jonathan Mark Wagner, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/448,458

(22) Filed: Nov. 24, 1999

(51) Int. Cl.[7] .................................................. G06F 9/00
(52) U.S. Cl. ..................................... 345/781; 345/764
(58) Field of Search ................................. 345/339, 340, 345/341, 342, 344, 355, 123, 127, 419, 764, 781, 786, 788, 790, 848, 783

(56) References Cited

U.S. PATENT DOCUMENTS

| | | | |
|---|---|---|---|
| 4,819,189 A | | 4/1989 | Kikuchi |
| 4,907,174 A | | 3/1990 | Priem |
| 5,602,564 A | | 2/1997 | Iwamura et al. |
| 5,714,983 A | * | 2/1998 | Sacks .......................... 345/156 |
| 5,772,297 A | | 6/1998 | Loo et al. |
| 5,854,634 A | * | 12/1998 | Kroitor ........................ 345/173 |
| 5,880,733 A | | 3/1999 | Horvitz et al. |
| 5,898,433 A | | 4/1999 | Hijikata |
| 5,929,853 A | * | 7/1999 | Guha ........................... 345/339 |
| 6,097,371 A | * | 8/2000 | Siddiqui et al. ............ 345/123 |

OTHER PUBLICATIONS

IBM Technical Disclosure Bulletin; vol. 35 No. 4A Sep. 1992—Three–Dimensional Windows for Virtual Reality Environment.

* cited by examiner

Primary Examiner—Cao H. Nguyen
(74) Attorney, Agent, or Firm—Marilyn Smith Dawkins; Bracewell & Patterson, L.L.P.

(57) ABSTRACT

A three-dimensional graphical user interface is provided wherein the windows have a "thickness" property. In the preferred embodiment, a window will have a Z plane position (z) and a Z plane thickness (cz) as well as the traditional x, cx, y and cy. This allows positioning anywhere in three dimensional space. Using either a three axis mouse or a conventional mouse with supplemental control (perhaps keyboard), each axis may be traversed to navigate the desktop. As the pointer moves along an axis, the user's point of view can change, bringing the view either closer/farther/ left/right, depending on the direction of motion, which may cause the windows perspective to change, e.g., larger or smaller. The user's perspective can pass into and through the window-blocks. As the user moves through a window-block, the mouse mickey ratio changes so that, while the cursor position or user viewpoint might change relatively rapidly in "empty space," it would change more slowly when the user's perspective or the cursor is moving through a solid window-block, thus making the window-block seem more substantial.

23 Claims, 3 Drawing Sheets

THREE-DIMENSIONAL GUI WINDOWS WITH VARIABLE-SPEED PERSPECTIVE MOVEMENT

BACKGROUND OF THE INVENTION

1. Technical Field

The present invention generally relates to computer displays and in particular to graphical user interfaces. Still more particularly, the present invention relates to three-dimensional representations in a graphical user interface.

2. Description of the Related Art

In recent years, virtually all personal computers and workstations have adopted a graphical user interface (GUI) environment, which allows the user to manage the system and execute applications using a "point-and-click" method on objects shown on the computer display. The main GUI background is commonly referred to as the "desktop", and these objects typically include graphic icons, which represent some software application or function, and windows, which divide the desktop into different areas on the display for different applications.

Even more recently, as graphics processing systems have become more robust and less expensive, 3-dimensional (3D) graphics are becoming more commonplace. Originally found only in computer-aided design systems, some modeling systems, and some advanced gaming systems, 3D graphics are now seen on internet web pages, spreadsheets, and other common applications. Further, GUI computer interfaces are beginning to move from a common 2-dimensional (2D) perspective to a more visually stunning 3D perspective.

A 3D GUI interface allows different windows to appear to be actually in front of or behind one another, instead of simply overlapping as in conventional systems. Further, the 3D desktop can be "rotated in space" on the computer display. The icons in such a system are no longer a simple 2D picture, but are instead 3D objects.

SUMMARY OF THE INVENTION

It is therefore one object of the present invention to provide an improved computer display.

It is another object of the present invention to provide an improved graphical user interface.

It is yet another object of the present invention to provide improved three-dimensional representations in a graphical user interface.

The foregoing objects are achieved as is now described. According to the preferred embodiment, a three-dimensional graphical user interface is provided wherein the windows have a "thickness" property. In the preferred embodiment, a window will have a Z plane position (z) and a Z plane thickness (cz) as well as the traditional x, cx, y and cy. This allows positioning anywhere in three dimensional space. Using either a three axis mouse or a conventional mouse with supplemental control (perhaps keyboard), each axis may be traversed to navigate the desktop. As the pointer moves along an axis, the user's point of view can change, bringing the view either closer/farther/left/right, depending on the direction of motion, which may cause the windows perspective to change, e.g., larger or smaller. The user's perspective can pass into and through the window-blocks. As the user moves through a window-block, the mouse mickey ratio changes so that, while the cursor position or user viewpoint might change relatively rapidly in "empty space," it would change more slowly when the user's perspective or the cursor is moving through a solid window-block, thus making the window-block block seem more substantial.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
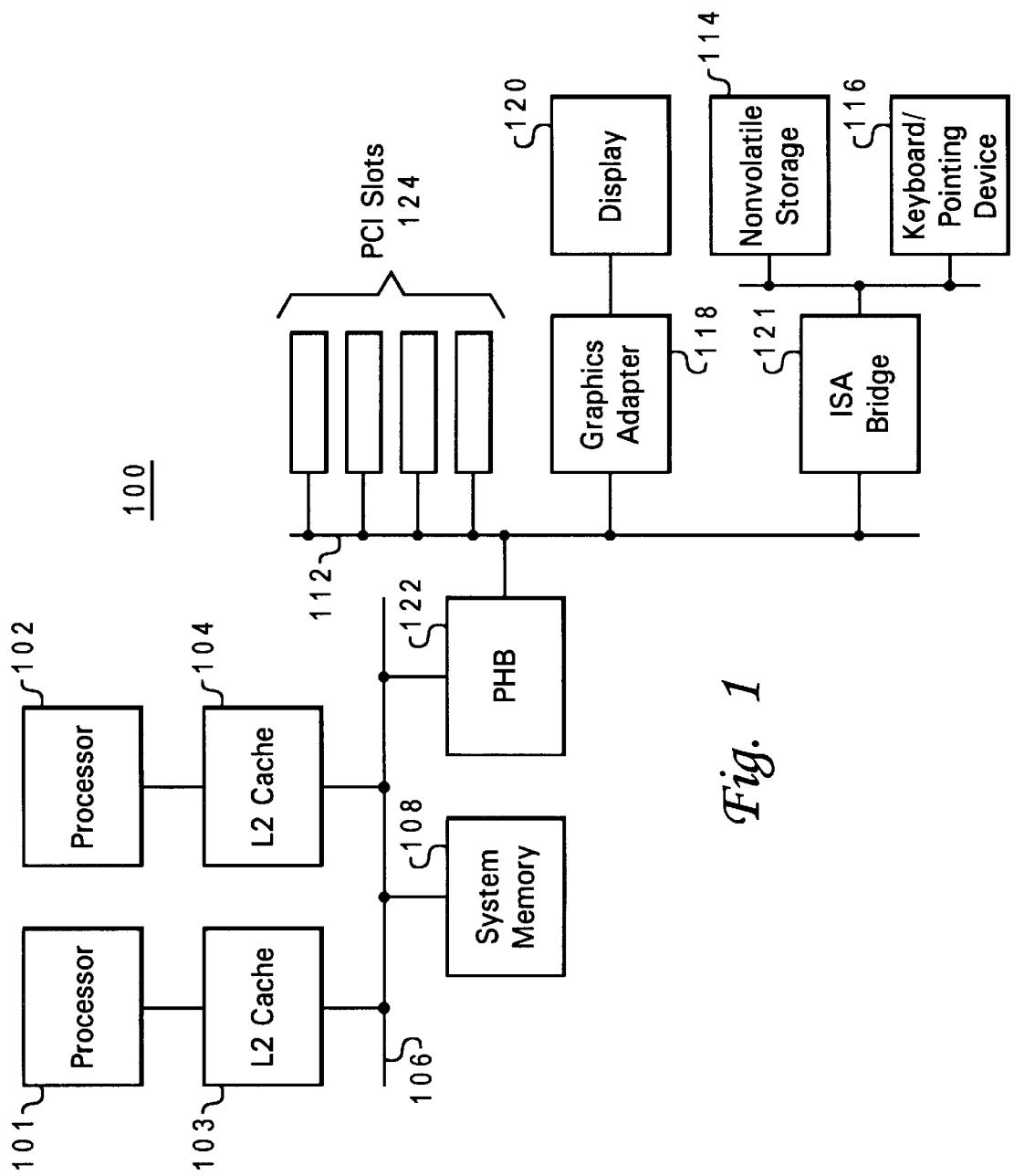
FIG. 1 depicts a data processing system in accordance with a preferred embodiment of the present invention.

With reference now to the figures, and in particular with reference to FIG. 1, a block diagram of a data processing system in which a preferred embodiment of the present invention may be implemented is depicted. Data processing system 100 may be, for example, one of the computers available from International Business Machines Corporation of Armonk, N.Y. Data processing system 100 includes processors 101 and 102, which in the exemplary embodiment are each connected to level two (L2) caches 103 and 104, respectively, which are connected in turn to a system bus 106.

Also connected to system bus 106 is system memory 108 and Primary Host Bridge (PHB) 122. PHB 122 couples I/O bus 112 to system bus 106, relaying and/or transforming data transactions from one bus to the other. In the exemplary embodiment, data processing system 100 includes graphics adapter 118 connected to I/O bus 112, receiving user interface information for display 120. Peripheral devices such as nonvolatile storage 114, which may be a hard disk drive, and keyboard/pointing device 116, which may include a conventional mouse, a trackball, or the like, are connected via an Industry Standard Architecture (ISA) bridge 121 to I/O bus 112. PHB 122 is also connected to PCI slots 124 via I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention. Data processing system 100 and the exemplary icon figures below are provided solely as examples for the purposes of explanation and are not intended to imply architectural limitations.

According to the preferred embodiment, a three-dimensional graphical user interface is provided wherein the windows have a "thickness" property, and are hereafter referred to as "window-blocks." In the preferred embodiment, a window-block will have a Z plane position (z) and a Z plane thickness (cz) as well as the traditional x, cx, y and cy. This allows positioning anywhere in three dimensional space.

In today's windowing system (e.g., Windows, Presentation Manager, X Windows) the Z plane is limited to a Z order only, which simply indicates the order in which the two-dimensional windows appear, from top to bottom. This restricts windows to merely overlapping each other much like a stack of papers. The preferred embodiment greatly improves upon this by adding depth characteristics to each window-block.

Figure 2:
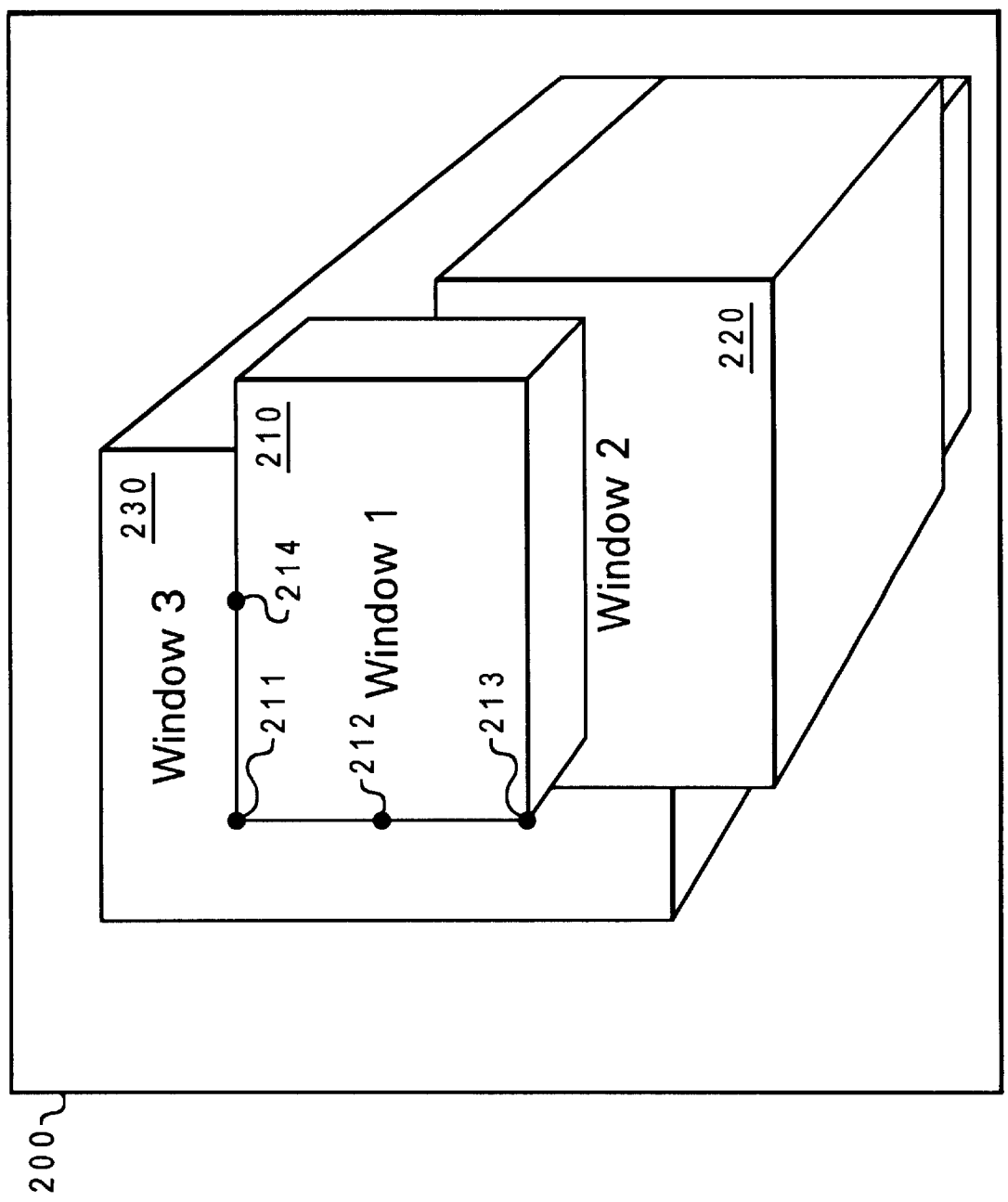
FIG. 2 is a block diagram of a three-dimensional GUI system in accordance with a preferred embodiment of the invention.

FIG. 2 shows an exemplary computer display with three-dimensional window-blocks, in accordance with a preferred embodiment of the invention. In this example, the main display 200 contains three window-blocks. Each of the window-blocks has a different dimension: Window1 210 is the most shallow window-block, and is foremost in the display. Window2 220 appears behind Window1 210 and is much deeper, and Window3 230 is the most distant window from the user. Note also that Window2 220 extends into, and merges with, Window3 230.

In this figure, each of the three window-blocks is shown with a similar perspective, for the sake of clarity, but the preferred embodiment provides that each window-block can be manipulated in three-dimensions. By using the mouse or other pointing device, and a now-conventional "clic-and-drag" approach, the user can grasp the handles of a window-block, e.g., handles 211/212/213/214 of Window1 210, to stretch or compact the window-block's dimensions, or to rotate the window-block in three dimensions. Because each window-block is three-dimensional and can be rotated, each window-block comprises six surfaces on which information can be displayed. This would be useful, e.g., to display different pages of a spreadsheet over several sides of a window-block, or to display the same data in different forms on different sides. For example, one side might show a spreadsheet, while another side displayed a corresponding line graph and a third side displayed a corresponding bar chart.

Using either a three axis mouse or a conventional mouse with supplemental control, e.g., a keyboard, each axis may be traversed to navigate the desktop. As the pointer moves along an axis, the user's point of view can change, bringing the view either closer/farther/left/right, depending on the direction of motion, which may cause the perspective of the window-block to change, e.g., to get larger or smaller.

Optionally, as the z position changes, window-blocks that are passed just disappear, instead of just changing perspective. As the cursor is moving through a window, the window-block has attributes which dictate its visual and physical behavior. For example, as the pointer is moved through a window-block the mouse mickey ratio, i.e., the amount the on-screen cursor or perspective moves relative to the distance the mouse or other pointing device has been moved, can change, giving the illusion of traversing through water or a thick substance. In this way, while the cursor position or user viewpoint might change relatively rapidly in "empty space," it would change more slowly when the user's perspective or the cursor is moving through a solid window-block, thus making the window-block seem more substantial.

Figure 3:
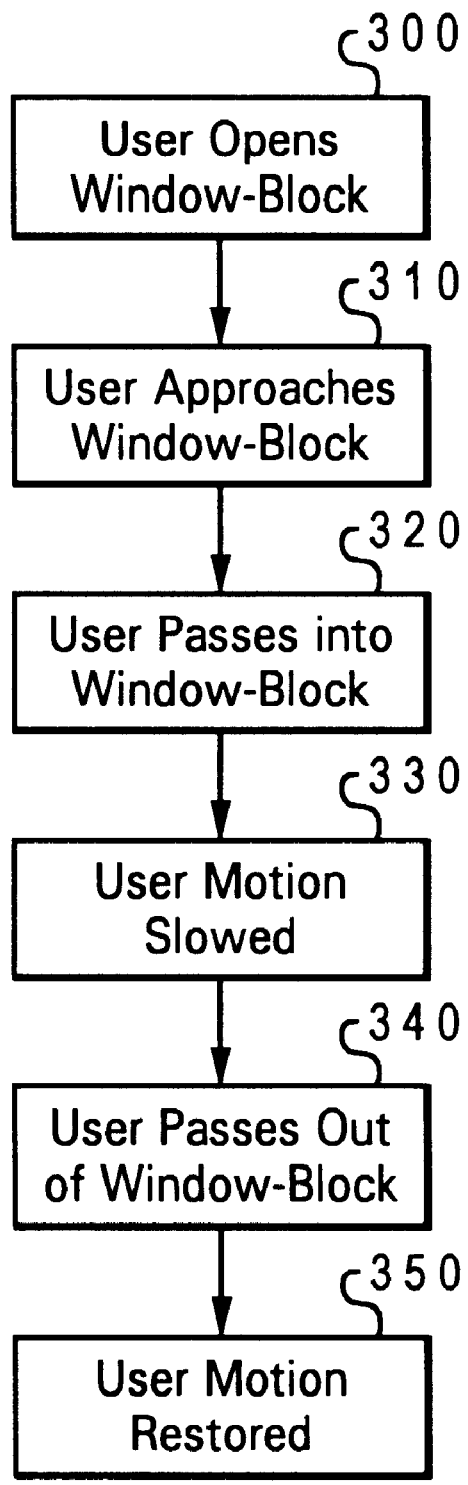
FIG. 3 depicts a flowchart of a process in accordance with a preferred embodiment of the invention.

FIG. 3 is a flowchart of a process in accordance with the preferred embodiment. Initially, the user opens a window-block (step 300) in a conventional manner, and it is displayed in the same manner shown in FIG. 2. The user may then use his mouse to manipulate the window-block, and to change his perspective relative to the window block.

The user may choose to "zoom" closer to the window block (step 310). As he does so, since he is moving through "empty" space, the perspective changes at a standard rate. As the user passes through the surface of and into the window block (step 320), however, the rate of change of perspective can be slowed significantly (step 330). Although he "moves" more slowly, the user can still change his perspective freely.

Eventually, the user will pass out of the window-block (step 340). When he does so, assuming the he is passing back into empty space and not into another window-block, the user's motion is restored to the standard rate of change of perspective (step 350).

The visual attributes may also change, as a window-block is approached, it may appear opaque, as the cursor is moved through it, its appearance may change to become more and more translucent until finally transparent. Each window-block may have its specific profile or set of attributes as well as the space between the window-blocks. These windows-blocks may also intersect with each other.

Further, the interior of a window-block may also represent data, which changes as the user moves through the window-block. For example, a window-block may represent a book which displays, on the surface of the window-block, a the cover or a given page. As the user moves deeper into the interior of the window-block, the display would change to show successive pages of the book. In this manner, the z-axis is used to move efficiently through what would otherwise be two-dimensional data.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for operating a graphical user interface, comprising:

displaying at least one window-block in a graphical user interface, the window-block having a three-dimensional appearance including an x-dimension, a y-dimension, and a z-dimension, wherein said graphical user interface is displayed only in said x-dimension and said y-dimension on a display medium;

in response to an input from a user, changing the perspective, at a first rate of change, of the graphical user interface display with relation to the window-block; and in response to an input from the user, when the perspective of the graphical user interface display with relation to the window-block indicates that the user is moving through the window-block along said z-dimension, changing the perspective of the graphical user interface display with relation to the window-block at a second rate of change, wherein the second rate of change is slower that the first rate of change.

2. The method of claim 1, wherein application data is displayed on at least one side of the window-block.

3. The method of claim 1, wherein multiple window-blocks are displayed.

4. The method of claim 1, wherein the window-block can be rotated and reshaped in three dimensions.

5. The method of claim 1, wherein the input from the user is received via a computer mouse.

6. The method of claim 1, wherein the input from the user is received via a keyboard.

7. The method of claim 1, wherein the color of the graphical user interface indicates when the perspective of the graphical user interface display with relation to the window-block indicates that the user is moving through the window-block.

8. A computer system having at least a processor, accessible memory, and an accessible display, the computer system comprising:

means for displaying at least one window-block in a graphical user interface, the window-block having a three-dimensional appearance including an x-dimension, a y-dimension, and a z-dimension, wherein said graphical user interface is displayed only in said x-dimension and said y-dimension within said computer system;

means for, in response to an input from a user, changing the perspective, at a first rate of change, of the graphical user interface display with relation to the window-block; and means for, in response to an input from the user, when the perspective of the graphical user interface display with relation to the window-block indicates that the user is moving through the window-block along said z-dimension, changing the perspective of the graphical user interface display with relation to the window-block at a second rate of change, wherein the second rate of change is slower than the first rate of change.

9. The system of claim 8, wherein application data is displayed on at least one side of the window-block.

10. The system of claim 8, wherein multiple window-blocks are displayed.

11. The system of claim 8, wherein the window-block can be rotated and reshaped in three dimensions.

12. The system of claim 8, wherein the input from the user is received via a computer mouse.

13. The system of claim 8, wherein the input from the user is received via a keyboard.

14. The system of claim 8, wherein the color of the graphical user interface indicates when the perspective of the graphical user interface display with relation to the window-block indicates that the user is moving through the window-block.

15. A computer program product having computer readable program code on a computer usable medium, comprising:

instructions for displaying at least one window-block in a graphical user interface, the window-block having a three-dimensional appearance including an x-dimension, a y-dimension, and a z-dimension, wherein said graphical user interface is displayed only in said x-dimension and said y-dimension on a display medium;

instructions for, in response to an input from a user, changing the perspective, at a first rate of change, of the graphical user interface display with relation to the window-block; and instructions for, in response to an input from the user, when the perspective of the graphical user interface display with relation to the window-block indicates that the user is moving through the window-block along said z-dimension, changing the perspective of the graphical user interface display with relation to the window-block at a second rate of change, wherein the second rate of change is slower than the first rate of change.

16. The computer program product of claim 15, wherein application data is displayed on at least one side of the window-block.

17. The computer program product of claim 15, wherein multiple window-blocks are displayed.

18. The computer program product of claim 15, wherein the window-block can be rotated and reshaped in three dimensions.

19. The computer program product of claim 15, wherein the input from the user is received via a computer mouse.

20. The computer program product of claim 15, wherein the input from the user is received via a keyboard.

21. The computer program product of claim 15, wherein the color of the graphical user interface indicates when the perspective of the graphical user interface display with relation to the window-block indicates that the user is moving through the window-block.

22. A method for operating a graphical user interface, comprising:

displaying at least one window-block in a graphical user interface, the window-block having a three-dimensional appearance including an x-dimension, a y-dimension, and a z-dimension, and displaying on at least one surface including only said x-dimension and said y-dimension a subset of user data;

in response to an input from a user, changing the perspective, at a first rate of change, of the graphical user interface display with relation to the window-block; and in response to an input from the user, when the perspective of the graphical user interface display with relation to the window-block indicates that the user is moving through the window-block along said z-dimension, displaying other subsets of the user data.

23. The method of claim 22, wherein the subsets of user data each represent different portions of text from an electronic book.

* * * * *